US009253041B2

(12) United States Patent
Previdi et al.

(10) Patent No.: US 9,253,041 B2
(45) Date of Patent: Feb. 2, 2016

(54) ADVERTISING LAYER 0 NETWORK TOPOLOGY INFORMATION TO A LAYER 3 NETWORK

(71) Applicant: Cisco Technology, Inc., San Jose, CA (US)

(72) Inventors: Stefano B. Previdi, Rome (IT); Clarence Filsfils, Brussels (BE); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 201 days.

(21) Appl. No.: 13/961,979

(22) Filed: Aug. 8, 2013

(65) Prior Publication Data

US 2015/0010301 A1    Jan. 8, 2015

Related U.S. Application Data

(60) Provisional application No. 61/842,418, filed on Jul. 3, 2013.

(51) Int. Cl.
*H04L 12/24* (2006.01)
*H04B 10/27* (2013.01)

(52) U.S. Cl.
CPC ............... *H04L 41/12* (2013.01); *H04B 10/27* (2013.01)

(58) Field of Classification Search
None
See application file for complete search history.

(56) References Cited

U.S. PATENT DOCUMENTS

| | | | |
|---|---|---|---|
| 7,173,912 B2 * | 2/2007 | Jaber et al. ................. | 370/254 |
| 2005/0094566 A1 * | 5/2005 | Hares ......................... | 370/238 |
| 2006/0126642 A1 * | 6/2006 | Kojima et al. ............. | 370/395.52 |
| 2006/0193248 A1 * | 8/2006 | Filsfils et al. ............. | 370/216 |
| 2009/0086622 A1 * | 4/2009 | Ng ............................. | 370/219 |
| 2010/0272110 A1 * | 10/2010 | Allan et al. ................ | 370/395.53 |
| 2012/0221624 A1 | 8/2012 | Gerstel et al. | |
| 2012/0224506 A1 * | 9/2012 | Gredler et al. ............ | 370/254 |
| 2013/0305357 A1 * | 11/2013 | Ayyagari et al. .......... | 726/22 |
| 2013/0336103 A1 * | 12/2013 | Vasseur et al. ............ | 370/216 |
| 2014/0003232 A1 * | 1/2014 | Guichard et al. .......... | 370/230 |
| 2014/0112350 A1 * | 4/2014 | Kwon et al. ............... | 370/437 |

OTHER PUBLICATIONS

Cisco, "Cisco nLight™ Technology: A Multi-Layer Control Plane Architecture for IP and Optical Convergence," White Paper, Dec. 2012, pp. 1-11.
Gredler, et al., "North-Bound Distribution of Link-State and TE Information using BGP," IETF, Inter-Domain Routing, Internet-Draft, May 21, 2013, pp. 1-43.

* cited by examiner

*Primary Examiner* — Hicham Foud
(74) *Attorney, Agent, or Firm* — Edell, Shapiro & Finnan LLC

(57) ABSTRACT

In one embodiment, techniques are provided to generate a Border Gateway Protocol-Link State (BGP-LS) advertisement message comprising information configured to indicate topological information associated with a Layer 0 (L0) network, where the topological information includes information for connectivity within the L0 network that is available to a Layer 3 (L3) network. The advertisement message is sent to a node in the L3 network. The message sent from the L0 network is received at the node in the L3 network. The topological information in the message is analyzed in order to determine connections available to the L3 network, yet within the L0 network. A connection request is sent from the node in the L3 network to the L0 network and connections between the nodes in L3 network are established using available connections in the L0 network.

20 Claims, 9 Drawing Sheets

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |     TYPE (CIRCUIT DEFINITION)     |            LENGTH          |
 +-+-+-+-+-+-+-+-+-+-+-+-+-+-+-+-+-+-+-+-+-+-+-+-+-+-+-+-+-+-+-+-+
 |  PROTOCOL-ID  |   RESERVED    |     INSTANCE IDENTIFIER        |
 +-+-+-+-+-+-+-+-+-+-+-+-+-+-+-+-+-+-+-+-+-+-+-+-+-+-+-+-+-+-+-+-+
 |                   OPTICAL CIRCUIT ID(VARIABLE)                 |
 +-+-+-+-+-+-+-+-+-+-+-+-+-+-+-+-+-+-+-+-+-+-+-+-+-+-+-+-+-+-+-+-+
 |                HEAD-END NODE DESCRIPTORS (VARIABLE)            |
 +-+-+-+-+-+-+-+-+-+-+-+-+-+-+-+-+-+-+-+-+-+-+-+-+-+-+-+-+-+-+-+-+
 |                TAIL-END NODE DESCRIPTORS (VARIABLE)            |
 +-+-+-+-+-+-+-+-+-+-+-+-+-+-+-+-+-+-+-+-+-+-+-+-+-+-+-+-+-+-+-+-+
 |                  CIRCUIT DESCRIPTORS (VARIABLE)                |
 +-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          TYPE (ERO)           |            LENGTH             |
+-+-+-+-+-+-+-+-+-+-+-+-+-+-+-+-+-+-+-+-+-+-+-+-+-+-+-+-+-+-+-+-+
|                   PATH ATTRIBUTES (VARIABLE)                  |
+-+-+-+-+-+-+-+-+-+-+-+-+-+-+-+-+-+-+-+-+-+-+-+-+-+-+-+-+-+-+-+-+
|                    NODE IDENTIFIER (VARIABLE)                 |
+-+-+-+-+-+-+-+-+-+-+-+-+-+-+-+-+-+-+-+-+-+-+-+-+-+-+-+-+-+-+-+-+
|                    NODE IDENTIFIER (VARIABLE)                 |
+-+-+-+-+-+-+-+-+-+-+-+-+-+-+-+-+-+-+-+-+-+-+-+-+-+-+-+-+-+-+-+-+
|                              ...                              |
+-+-+-+-+-+-+-+-+-+-+-+-+-+-+-+-+-+-+-+-+-+-+-+-+-+-+-+-+-+-+-+-+
```

FIG.6B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      TYPE (POA-ID)            |           LENGTH              |
+-+-+-+-+-+-+-+-+-+-+-+-+-+-+-+-+-+-+-+-+-+-+-+-+-+-+-+-+-+-+-+-+
|                     POINT OF ATTACHMENT ID                    |
+-+-+-+-+-+-+-+-+-+-+-+-+-+-+-+-+-+-+-+-+-+-+-+-+-+-+-+-+-+-+-+-+
```

FIG.6C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     TYPE (POA STATE)          |           LENGTH              |
+-+-+-+-+-+-+-+-+-+-+-+-+-+-+-+-+-+-+-+-+-+-+-+-+-+-+-+-+-+-+-+-+
|                 POINT OF ATTACHMENT STATE FLAGS               |
+-+-+-+-+-+-+-+-+-+-+-+-+-+-+-+-+-+-+-+-+-+-+-+-+-+-+-+-+-+-+-+-+
```

FIG.6D

ADVERTISING LAYER 0 NETWORK TOPOLOGY INFORMATION TO A LAYER 3 NETWORK

CROSS-REFERENCE TO RELATED APPLICATION

This application claims priority to U.S. Provisional Application No. 61/842,418, filed Jul. 3, 2013, the entirety of which is incorporated herein by reference.

TECHNICAL FIELD

The present disclosure relates to sharing information about network topologies.

BACKGROUND

The Border Gateway Protocol (BGP) is a protocol that is used to make core routing decisions on large networks such as the Internet. BGP maintains tables identifying Internet Protocol (IP) networks or autonomous system (AS) prefixes that indicate network reachability among the autonomous systems. Autonomous system prefixes are numbers assigned in blocks by the Internet Assigned Numbers Authority (IANA) to Regional Internet Registries. The autonomous system prefix blocks are, in turn, assigned to various Internet Service Providers (ISPs) by the Regional Internet Registries. BGP is a path vector protocol by which routing decisions are made based on path, network policies and/or rule-sets. In this regard, it is more appropriately termed a reachability protocol rather than a routing protocol. Most Internet service providers use BGP to establish routing between one another. Therefore, even though most Internet users do not use BGP directly, BGP is one of the more important protocols of the Internet.

BRIEF DESCRIPTION OF THE DRAWINGS

FIGS. 6A-6E show example messages that may be employed according to the optical extension of the BGP-LS protocol.

DESCRIPTION OF EXAMPLE EMBODIMENTS

Overview

In one embodiment, techniques are provided to generate a Border Gateway Protocol-Link State (BGP-LS) advertisement message comprising information configured to indicate topological information associated with a Layer 0 (L0) network, where the topological information includes information for connectivity within the L0 network that is available to a Layer 3 (L3) network. The advertisement message is sent to a node in the L3 network to allow the node in the L3 network to generate a connection request to the L0 network for connecting nodes in the L3 network based on the topological information. In a typical example, the L0 network is an optical network and the L3 network is an IP network.

The message sent from the L0 network is received at the node in the L3 network. The topological information in the message is analyzed in order to determine connections available to the L3 network, yet within the L0 network. The connection request is sent from the node in the L3 network to the L0 network and connections between the nodes in L3 network are established using available connections in the L0 network.

Example Embodiments

According to the BGP Link State (LS) extension, Layer 3 topology information may be advertised between autonomous systems. However, the BGP-LS protocol has limitations in that topology information cannot be advertised when non-IP networks are employed or when topology information may be useful beyond IP Layer 3. Techniques are therefore presented herein to extend the BGP to advertise Layer 0 topology information to a Layer 3 network.

Figure 1:
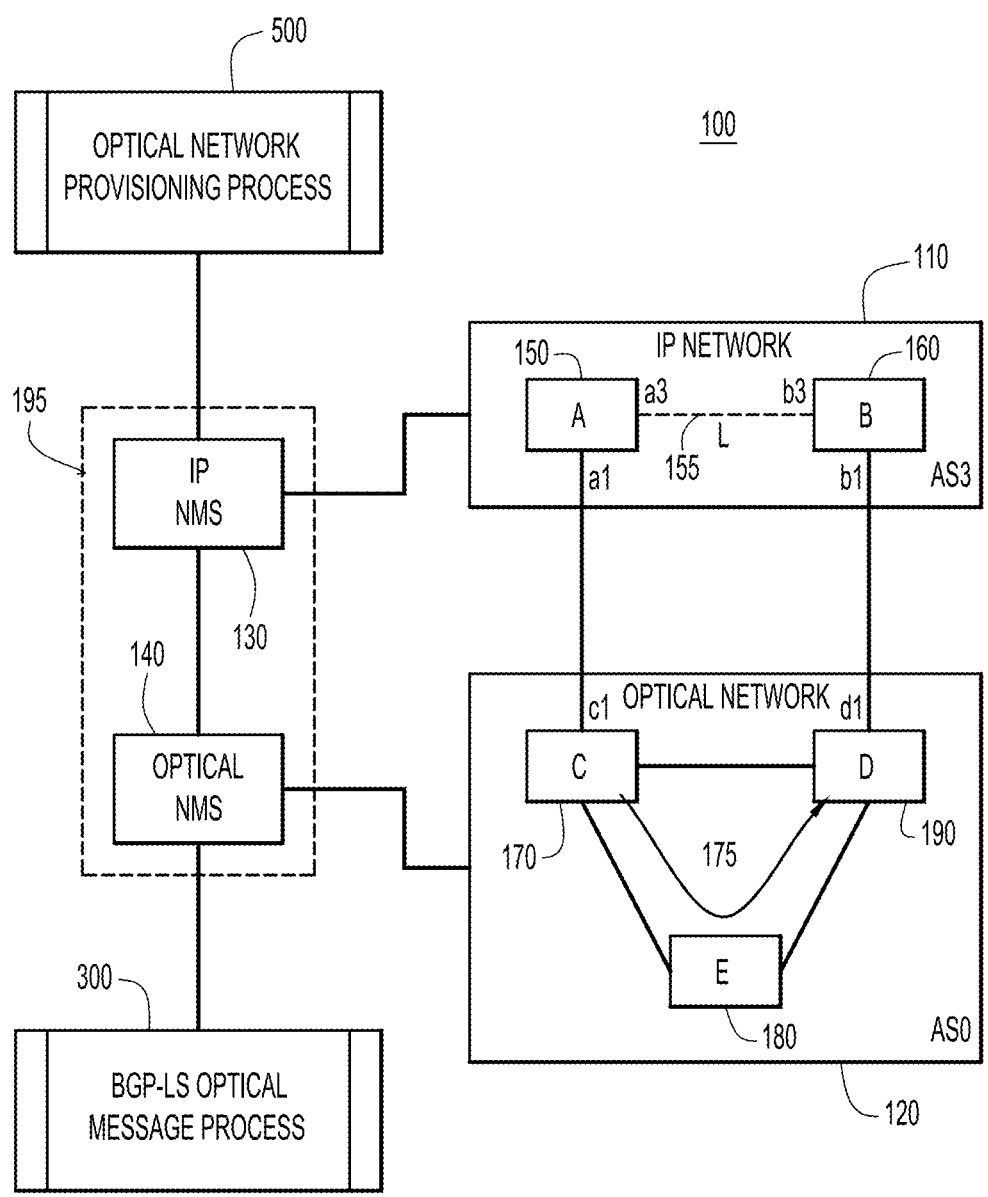
FIG. 1 shows a network that includes a Layer 3 (L3) autonomous system (AS), a Layer 0 (L0) AS, and Network Managements Systems (NMSs) associated with each of the L3 and L0 autonomous systems configured to exchange topology information according to the techniques described herein.

Referring to FIG. 1, a network 100 is depicted that includes an IP network 110, an optical network 120, an IP Network Management System (NMS) 130, and an optical NMS 140. In BGP parlance, IP network 110 is labeled as autonomous system layer-3 (AS3) and the optical network 120 is labeled as autonomous system layer-0 (AS0) as shown in FIG. 1. IP network 110 has two IP nodes 150 and 160, labeled A and B, respectively. Optical network 120 has three optical nodes 170, 180 and 190, labeled C, D and E, respectively.

The IP NMS 130 and optical NMS 140 are configured to exchange topology information according to the techniques described herein. In this example, the optical NMS 140 generates and sends messages with optical topology information by way of BGP-LS optical message process 300 to IP NMS 130, while IP NMS 130 receives the messages and uses the optical topology information to provision or request provisioning of the optical network 120 on behalf of the IP network 110 using optical network provisioning process 500. For example, IP NMS 130 can connect IP nodes A and B using paths in optical network 120. In this regard, the IP NMS 130 "owns" the connection between IP nodes A and B, yet by way of the connectivity available in optical network 120. The remaining figures are described within this context and this context is not intended to be a limiting example. In other words, it is possible for the optical NMS 140 to provision the IP network 110 on behalf of the optical network 120. BGP-LS optical message process 300, or simply process 300, is further described in connection with FIGS. 2 and 3, while optical network provisioning process 500, or simply process 500, is further described in connection with FIGS. 4 and 5. Example formats for messages exchanged between optical NMS 140 and IP NMS 130 are described in connection with FIGS. 6A-6E.

As shown in FIG. 1, nodes A-E are connected by various links. For ease of description, some of the link endpoints are labeled for IP connectivity. Each link shown in FIG. 1 is bidirectional and may be a combination of two unidirectional links. The labels are essentially points of attachment at a particular node. For example, node A has link endpoints labeled a1 and a3, node B has link endpoints labeled b1 and b3, node C has a link endpoints labeled c1 and node D has a link endpoints labeled d1. Node E does not have link endpoint labels since the node is wholly within optical network 120. Labels a1 and c1 are points of attachment for the link shown between nodes A and C. Accordingly, labels a3 and b3, and b1 and d1, are points of attachment for their respective links.

In order to send information describing the optical network topology from optical network 120 to IP network 110 a number of optical extension messages are presented herein that extend BGP-LS protocol to exchange topology information between optical and IP domains. In this regard, BGP-LS provides a convenient mechanism for the techniques presented herein. It will be appreciated that these techniques may be applied to other protocols. Thus, just as BGP, in general, replaced the Exterior Gateway Protocol (EGP), it can be anticipated that BGP may be replaced by another protocol in the future. Accordingly, as used herein, BGP, BGP-LS, and extensions thereof are meant to apply to protocols that may be developed as the field of networking advances for the exchange of the topology data between L0 and L3 networks.

BGP optical extensions messages are presented herein to explain information that may be used in one network domain to provide connections in the other cooperating network domain. BGP optical extensions messages send information for optical topology (T), optical circuit (C), point of attachment (P), and link (L) by way of example. The T messages convey the L0 topology that may be in the form a database known in Open Shortest Path First (OSPF) optical domain (if it is available), static provisioning, or otherwise known to the optical NMS 140, IP NMS 130, or other network optical network provisioning tool. Other information may be available via the Intermediate System-to-Intermediate System (IS-IS) protocol. IS-IS is an interior gateway protocol, designed for use within an administrative domain or network, in contrast to BGP, which is an exterior gateway protocol used for routing between autonomous systems as mentioned above.

In one example, a feature of BGP is the Network Layer Reachability Information (NLRI) message. The NLRI message can be used to send link and node representations present within optical network 120. For simplicity, one NLRI per node and one link NLRI per unidirectional link may be sent from optical NMS 140 to IP NMS 130. Once each node NLRI is sent, IP NMS 130 learns of optical nodes C, D, and E. Between the three optical nodes, IP NMS 130 can interpret six unidirectional link NLRIs: CD, DC, CE, EC, DE, and ED. In this example, optical node C advertises a C-to-D (CD) and a C-to-E (CE) NLRI, optical node D advertises a D-to-C (DC) and a D-to-E (DE) NLRI, and optical node E advertises an E-to-C (EC) and an E-to-D (ED) NLRI. Thus, the six unidirectional links become now known to IP NMS 130.

Given that the physical topology and links between nodes C, D, and E are now known to IP NMS 130, additional information may be provided. Additional optical link NLRI messages may be sent through the use of multiple type-length-value (TLV) messages that provide variable length and variable format message capabilities. As an example, FIG. 6A shows "type" and "length" fields, while any remaining fields can be considered a "value." In a further example, the value field may include data such as Area ID, Local Node, Remote Node, Link Descriptor (IP address, Topology Identifier) the may be sent in one or more messages. The node NLRI message identifies a node through identifiers (e.g., IPv4, IPv6, or other identifiers defined by the International Organization for Standardization (ISO)). Individual link attribute TLVs may include link bandwidth and other links metrics such as link latency, available and used wavelengths ($\lambda$).

The C messages convey optical circuit information as known in L0, i.e., in optical network 120 and optical NMS 140. The circuit NLRIs may contain circuit identifier (ID), explicit route object (ERO), and circuit latency and circuit state information. The most basic circuit NLRI provides an order list of nodes that are already known by way of the topology (T) messages and by which IP NMS 130 can surmise the corresponding unidirectional connections. A unidirectional circuit 175 is shown in FIG. 1. The unidirectional circuit 175 connects node C to node D via node E. Thus, the simplest of the circuit NLRIs may, e.g., be of the format {C, E, D}, that indicates a C-to-E and an E-to-D circuit path.

The next set of NLRI messages are the P messages that convey point of attachment (PoA) information between disparate (or not) ASs, e.g., attachments between an IP node in AS3 and an optical node in AS0 and vice versa. Each PoA message indicates a PoA from a first node to a second node and the associated AS for each node. To summarize, the T node and link NLRI messages provide the framework for the PoA messages. A PoA message may include the advertising node, associated autonomous system, source and destination points of attachment (PoAs). Accordingly, node A advertises {A, AS3, a1, c1} and node C advertises {C, AS0, c1, a1}, as viewed in FIG. 1. Similarly, node B advertises {B, AS3, b1, d1} and node D advertises {D, AS0, d1, b1}, thereby forming a complete connectivity model.

The L messages convey associations between the PoAs between two IP nodes attached to two optical nodes, i.e., an association between the AC PoA and the BD PoA. The association indicates L3 link routing adjacency, the optical circuit 175, and the PoAs. In this manner, IP NMS 130 can establish link 155 between IP nodes A and B using the optical network 120 and circuit 175. The L messages may be domain specific as indicated by L next to link 155. Since the IP NMS 130 has learned PoAs, optical node topology, and optical circuits, the IP NMS 130 can provision optical network 120 in order to establish link 155. Accordingly, when provisioned by IP NMS 130, packets or other network information sent from IP node A to IP node B, goes from IP node A to optical node C (PoA a1-c1), then to node D via node E using circuit 175, and subsequently to IP node B from node D (PoA d1-b1). An opposite path from IP node B to IP node A is similarly provisioned by IP NMS 130. Since no actual data is exchanged in this example directly between IP node A and IP node B entirely within IP network 110, but by way of optical network 120, link 155 is considered a virtual link as indicated by the dashed line shown in FIG. 1.

As shown in FIG. 1, a dashed line 195 is depicted around IP NMS 130 and optical NMS 140. Dashed line 195 indicates that NMSs 130 and 140 may be part of a single chassis or application that is coupled to the IP network 110 and optical network 120. Furthermore, the NMSs may be executed on chassis processing blades or as virtual machines (VMs). In this regard, the NMS executables may be VMs mediated by one or more hypervisors.

Figure 2:
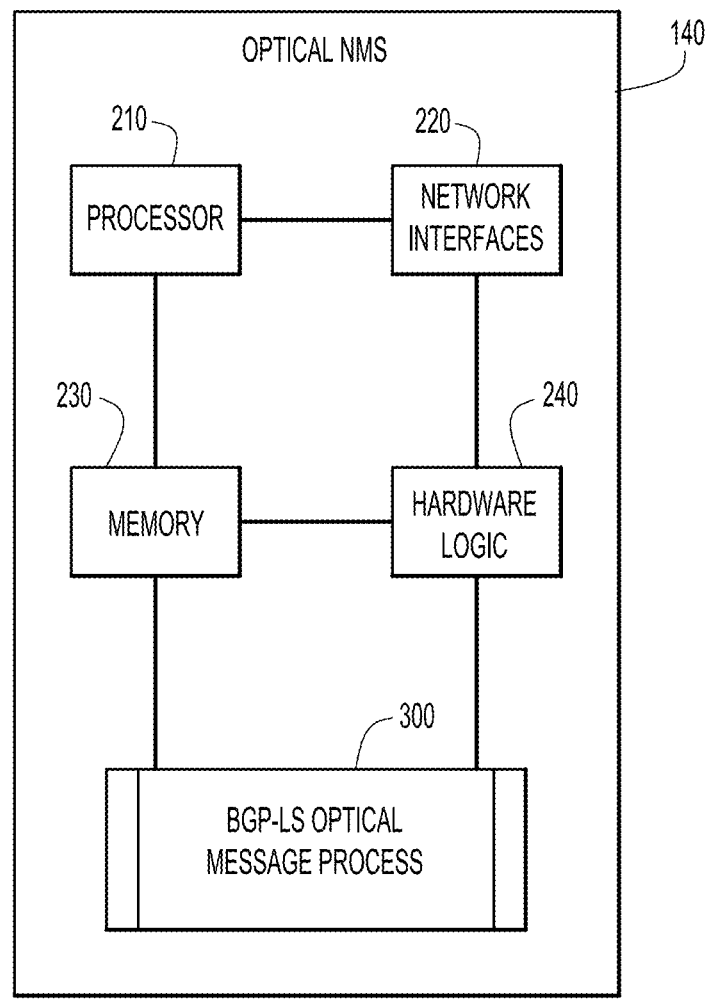
FIG. 2 shows an example of an L0 Network Management System configured to generate and send L0 network topology information to the L3 Network Management System using an optical extension of the BGP-LS protocol.

Referring now to FIG. 2, an example of an L0 NMS is shown, e.g., optical NMS 140, that is configured to generate and send L0 network topology information to the L3 NMS using an extension of BGP such as an optical extension of BGP-LS. Optical NMS 140 may be implemented using one or more hardware components, one or more software components, or combinations thereof. In one embodiment, optical NMS 140 includes a processor 210, memory 230, a network interface unit 220 for network connectivity, and fixed and or programmable hardware logic 240.

Processor 210 may be a programmable processor, e.g., microprocessor, digital signal processor (DSP), or microcontroller or a fixed-logic processor such as a field programmable gate array (FPGA) or an application specific integrated circuit (ASIC). The FPGA and/or ASIC, if employed, may include programmable components and a volatile and well as non-volatile memory (NVM) or firmware components. The memory 230 may be of any type of tangible processor readable memory (e.g., random access, read-only, etc.) that is encoded with or stores instructions to execute the BGP-LS optical message process 300 as described herein.

Thus, optical NMS 140 may take on any of a variety of forms, so as to be encoded, such as with fixed logic or programmable logic (e.g., software/computer instructions executed by a processor), and the processor may be a programmable processor, programmable digital logic (e.g., field programmable gate array) or an ASIC that comprises fixed digital logic, or a combination thereof. In general, any process logic or software may be embodied in a processor (or computer) readable medium that is encoded with instructions for execution by a processor that, when executed by the processor, are operable to cause the processor to perform the functions described herein, e.g., to implement BGP-LS optical message process 300. The BGP-LS optical message process 300 generates and sends information as generally described above in connection with optical NMS 140, and described further hereinafter and in connection with FIG. 3.

Figure 3:
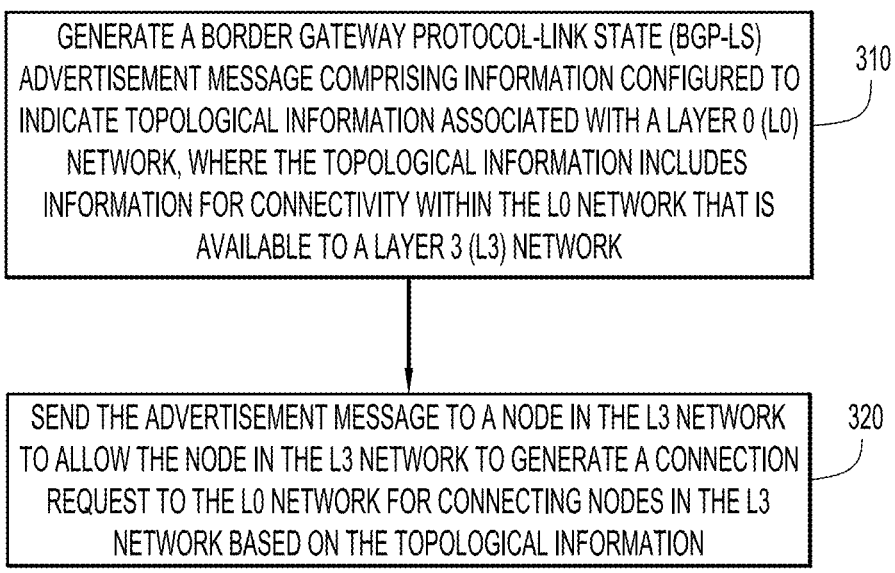
FIG. 3 shows an example process for generating and sending the L0 network topology information from the L0 Network Management System to the L3 Network Management System using the optical extension of the BGP-LS protocol.

Turning now to FIG. 3, process 300 is described. At 310, a BGP-LS advertisement message is generated comprising information configured to indicate topological information associated with a Layer 0 (L0) network, where the topological information includes information for connectivity within the L0 network that is available to a Layer 3 (L3) network. The basics of these advertisement messages have been describe above, and examples are described hereinafter in connection with FIGS. 6A-6E.

At 320, the advertisement message is sent to a node in the L3 network to allow the node in the L3 network to generate a connection request to the L0 network for connecting nodes in the L3 network based on the topological information. For example, IP node 130 can generate a connection request, or a more "intelligent" connection request, based on the topological information that takes into account the requirements of the L3 connection and the support available in the L0 network. As shown in FIG. 1, nodes A and B in the L3 network, e.g., IP network 110, can connect through the L0 network, e.g., optical network 120, using the messaging techniques described herein without an actual IP only link between nodes A and B.

As described above, the BGP messages are exchanged between IP NMS 130 and optical NMS 140, such that BGP NLRI messages are exchanged between those NMSs. In other examples, topological information messages may be exchanged directly between IP nodes and optical nodes, or between optical nodes and the IP NMS, or between the IP nodes and the optical NMS. When topological information is generated in IP or optical nodes, those nodes are programmed with the appropriate instructions to generate the respective topological information messages.

Example BGP extension messages, e.g., T, C, P, and L messages, are individually described hereinafter in connection with FIGS. 6A-6E.

Figure 4:
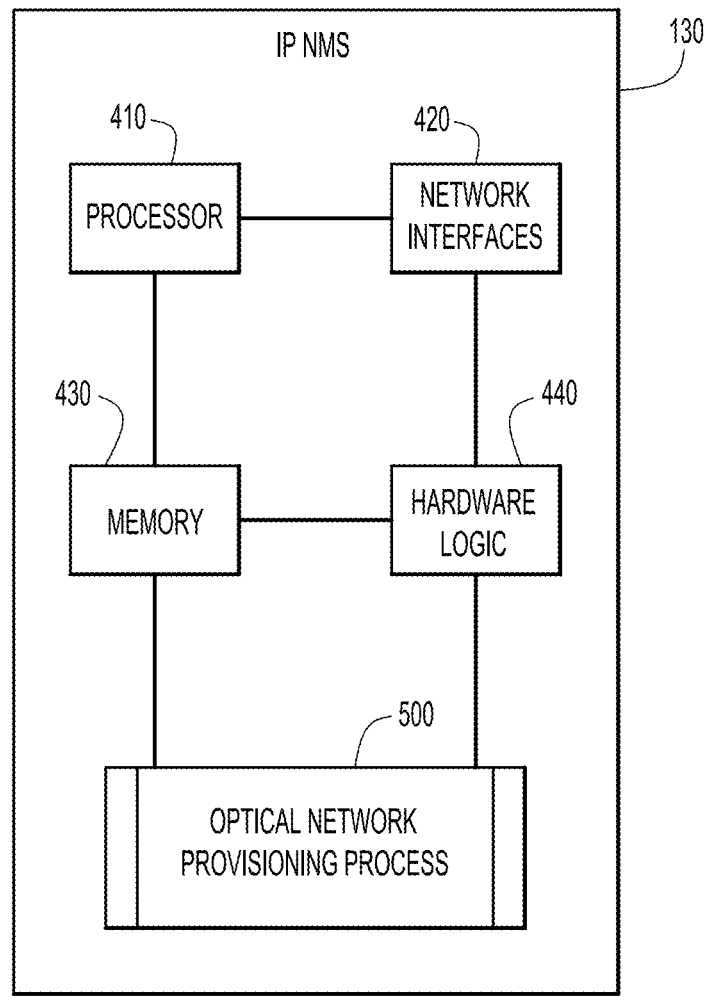
FIG. 4 shows an example of an L3 Network Management System configured to receive the L0 network topology information and use the L0 network topology information to generate and send a connection request to the L0 network.

Turning now to FIG. 4, an example of an L3 NMS is shown, e.g., IP NMS 130, that is configured to analyze the L0 network topology information sent by the L0 NMS using the aforementioned optical extension of BGP-LS. IP NMS 130 is configured similarly to optical NMS 140 and includes a processor 410, memory 430, a network interface unit 420 for network connectivity, and fixed and or programmable hardware logic 440. Processor 410 may be a programmable processor, e.g., microprocessor, DSP, or microcontroller or a fixed-logic processor such as an FPGA or an ASIC as described above. The memory 430 is encoded with or stores instructions, e.g., software, to execute the optical network provisioning process 500 as described herein. The optical network provisioning process 500 analyzes the topology information sent from optical IP NMS 140, and generates provisioning requests based on the L0 topology in order to establish L3 node to L3 node connections via the L0 network, e.g., using optical network provisioning process 500.

Figure 5:
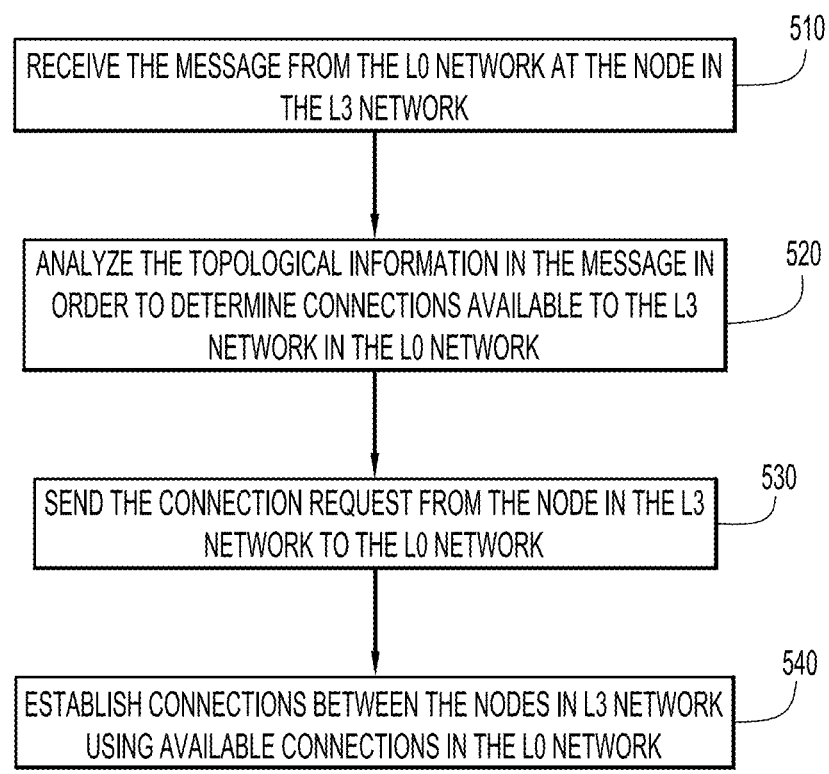
FIG. 5 shows an example process for receiving the L0 network topology information at the L3 NMS, and generating and sending the connection request from the L3 Network Management System to the L0 network.

Referring to FIG. 5, process 500 is described. At 510, the message (from the L0 NMS) is received at a node in the L3 network, e.g., IP NMS 130. At 520, the topological information in the message is analyzed in order to determine connections available to the L3 network in the L0 network. At 530, the connection request is sent from the node in the L3 network to the L0 network. At 540, connections between the nodes in L3 network are established using available connections in the L0 network.

There are example implementations options for implementing AS-to-AS system messaging by way of the techniques described herein. According to a first option, an NMS tool originates all necessary messaging, e.g., using the optical extensions of BGP-LS NLRIs described herein. The NMS may be IP NMS 130, optical NMS 140, or combination NMS 195 shown in FIG. 1. The messaging may provide a standardized application interface (API) between, e.g., optical layers and IP Path Computation Elements (PCEs). In another option, each node, e.g., the L3 or L0 nodes themselves advertise BGP-LS NLRIs for T, C, P and L messages, whether individually or by way of message aggregation nodes. In this option, each node has a given amount of intelligence in order to generate and act upon the messages. This option may have scaling issues, and each node is programmed with any requisite logic.

Example T (Topology) Message Formats

For ease of description, some of the TLV formats for the NLRI messages described herein may follow formats similar to those formats defined by the Internet Engineering Task Force (IETF). These formats may be adapted according the particular application or need. For example, node topology and link topology messages may borrow those formats defined for the BGP-LS standards and are not detailed herein. These messages also typically include a "type" field, and as in all TLVs and NLRIs, the type field indicates the type of information contained within the message. The TLVs also include a "length" field that is used to indicate the length of the NLRI, e.g., a number of bytes or words, and a "value" filed that includes the information of interest indicate by the type field.

The node topology message provides a list of nodes, e.g., nodes 1-N such as L0 network nodes {C, D, E} without regard to any particular node order, that may be available to the controlling network. In other words, a list of nodes in the L0 network that are available to the L3 network may be listed. A link topology NLRI message or link NLRI comprises a list "coupled nodes." The list of nodes is provided as a list of coupled nodes in a "linked" format. The link topology message provides potential couplings or connections between the nodes provided in node topology message. Thus, coupled nodes are nodes that have a direct physical connection that does not involve an intermediate node. In one example, coupling between nodes C, D, and E in L0 network 120 is provided in link message in the form of a unidirectional link such as a C to E connection, denoted as CE. Node C is can be considered a start or "source node" as and node E can be considered as a destination or "coupled node" for a single unidirectional link denoted as CE.

Accordingly, all potential unidirectional connections or links between L0 nodes C, D, and E can be a unidirectional source and unidirectional coupled node that yields six potential connections that can be denoted as {CD, DC, CE, EC, DE, and ED} for corresponding C to D, D to C, C to E, E to C, D to E, and E to D unidirectional connections. In this regard, the source node descriptor advertised by node C in a link topology message for the CD connection could be of the format {C, AS0} which indicates that node C is within AS0, e.g., the L0 network. The destination node descriptor advertised by node C for the CD connection could be of the format {D, AS0} which indicates that node D is also within AS0. The combination of the source node descriptor and the destination node descriptor indicates the unidirectional link from C to D. It should be noted that all six of the potential unidirectional connections in the example depicted may not be available, and a subset of source and coupled nodes may be provided by way of the respective NLRI messages.

The link NLRI messages may further include additional information such as L0 link delay and link delay variability or delay jitter. The delay and delay variation ($\sigma$) are the network delay and the variation of that network delay between any two coupled nodes. The delay and delay variation may be represented in any convenient units, e.g., microseconds or picoseconds. The delay and delay variation ($\sigma$) may follow the link definition in the value field of the link NLRI.

The link NLRI may also include a set or list of link resources and/or additional attributes. The link resources may be transmitted in any suitable format and may include used and available wavelengths ($\lambda$), link bandwidth, or any other desired link characteristics. It should be noted that the link NLRI may be transmitted directly after a corresponding node topology NLRI message is transmitted. As a result, the link NLRI may be temporally associated with node topology NLR message and may be considered to be sub-TLVs with respect to the link message. Sub-TLVs have an added benefit of being able to use a lesser number of bits for their type fields due to their association with a primary TLV.

Example C (Circuit) Message Formats

An example circuit definition NLRI message 610 is shown in FIG. 6A. This example message contains "protocol-ID," "instance identifier," "optical circuit ID," "head-end node descriptors," "tail-end node descriptors," and "circuit descriptors" fields. In this example, the value fields comprise 32-bit number that identifies the corresponding object, e.g., the various descriptors.

An example circuit ERO NLRI sub-TLV message 620 is depicted in FIG. 6B. Message 620 includes "path attributes" and one or more "node identifier" fields. The ERO identifies the unidirectional route from the head-end node to the tail-end node identified by message 610 shown in FIG. 6A. Circuit latency or delay and delay variation information may be included in the path attributes field. The circuit delay and circuit delay variation messages may follow the same format as in the link delay message and the link delay variation information described above. The node identifiers may be any suitable identifier, e.g., an IPv4 or IPv6 type address for use in the L3 network.

Example P (PoA) Message Formats

An example PoA identifier NLRI TLV message 630 is depicted in FIG. 6C. The PoA identifier provides a descriptor that ties a node in the L0 network to a node in the L3 network. As viewed in FIG. 1, L0 node C and L3 node A are advertised to allow the L3 network to tie the T, C, and L messages together, thereby providing a complete "picture" of the L0 network topology and the associated node, link, and circuit capabilities and other attributes. In one example, the PoA identifier may be of the form { [A, AS3], [C, AS0], [a1, c1] }, and includes an ID that can be used by the L3 network to reference the PoA. These descriptors provide node IDs, the associated autonomous systems, as well as the PoA identifiers a1 and c1, as described above. Accordingly, a complete link is provided for nodes in the L3 to exchange data between themselves by way of the L0 network by coupling node pairs between respective autonomous systems.

In addition, PoA state flags may be provided to indicate a state of any particular PoA between nodes of two autonomous systems. An example PoA state flags NLRI sub-TLV message 640 is depicted in FIG. 6D. The state flags may include an administrative state such as up or down, a functional state such as working or not, and a spare state such as used or not. Other state information may be included depending on system design.

Example L (Link) Message Formats

Figure 6E:
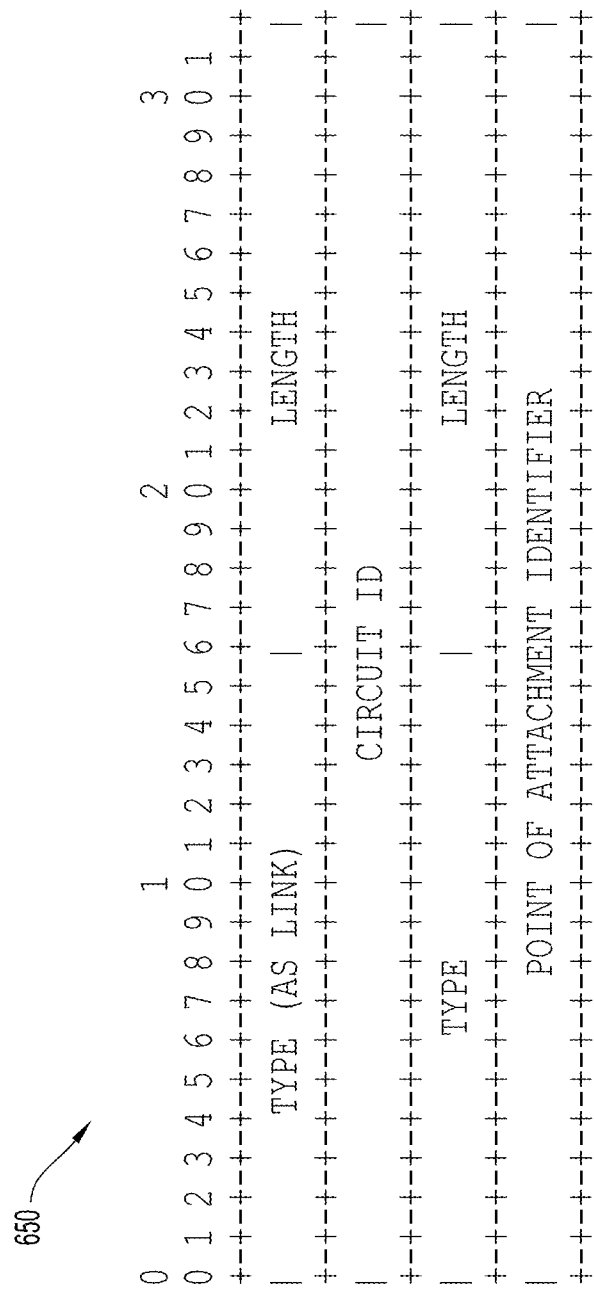

An example AS link message 650 is depicted in FIG. 6E. This message provides an association between a circuit and a PoA. Having this last piece of information allows the provisioning NMS, i.e., IP NMS 130 in this example, to complete a connection within its domain, e.g., the L3 network, using the complete topology provided by the NLI messages described above. Thus, IP NMS 130 can complete the AC and CA connection in IP network 110 using the optical network 120, thereby establishing virtual link 155.

In summary, a method, apparatus, and software are provided to generate a Border Gateway Protocol-Link State (BGP-LS) advertisement message comprising information configured to indicate topological information associated with a Layer 0 (L0) network, where the topological information includes information for connectivity within the L0 network that is available to a Layer 3 (L3) network. The advertisement message is sent to a node in the L3 network to allow the node in the L3 network to generate a connection request to the L0 network for connecting nodes in the L3 network based on the topological information. In a typical example, the L0 network is an optical network and the L3 network is an IP network.

The message sent from the L0 network is received at the node in the L3 network. The topological information in the message is analyzed in order to determine connections available to the L3 network, yet within the L0 network. The connection request is sent from the node in the L3 network to the L0 network and connections between the nodes in L3 network are established using available connections in the L0 network.

The above described techniques provide several advantages. These techniques provide a solution for an unsolved problem. In current IP networks that take advantage optical network efficiency there is no automated solution for integrating both types of networks, i.e., L0 and L3 network types. This problem is unsolved for the vast majority of Service Providers (SPs). A few SPs have used human resources to patch the information from various independent sources together. However, patches made by humans are complex, error prone, and never complete. Accordingly, the techniques described herein allow for an automated discovery and correlation of the various pieces of the multi-layer representation, i.e., the topology (T, C, L, and P messages) of an AS. The messages described herein further provide a framework for a standardized solution to a problem which is historically characterized by proprietary interfaces.

In summary, a method is provided comprising generating a Border Gateway Protocol-Link State (BGP-LS) advertisement message comprising information configured to indicate topological information associated with an Layer 0 (L0) network, wherein the topological information includes information for connectivity within the L0 network that is available to a Layer 3 (L3) network; and sending the advertisement message to a node in the L3 network to allow the node in the L3 network to generate a connection request to the L0 network for connecting nodes in the L3 network based on the topological information.

Similarly, an apparatus is provided comprising a network interface unit configured to communicate between a Layer 0 (L0) network and a Layer 3 (L3) network; a processor coupled to the network interface unit and configured to: generate a Border Gateway Protocol-Link State (BGP-LS) advertisement message comprising information configured to indicate topological information associated with the L0 network, wherein the topological information includes information for connectivity within the L0 network that is available to the L3 network; and send the advertisement message to a node in the L3 network to allow the node in the L3 network to generate a connection request to the L0 network for connecting nodes in the L3 network based on the topological information.

Still further, a processor readable storage media is provided that is encoded with instructions that, when executed by a processor, cause the processor to: generate a Border Gateway Protocol-Link State (BGP-LS) advertisement message comprising information configured to indicate topological information associated with an Layer 0 (L0) network, wherein the topological information includes information for connectivity within the L0 network that is available to a Layer 3 (L3) network; and send the advertisement message to a node in the L3 network to allow the node in the L3 network to generate a connection request to the L0 network for connecting nodes in the L3 network based on the topological information.

The above description is by way of example only.

What is claimed is:

1. A method comprising:
    generating, by a network management system of a Layer 0 (L0) network domain, one or more Border Gateway Protocol-Link State (BGP-LS) advertisement messages comprising L0 layer connectivity information associated with the L0 network domain, wherein the L0 network domain comprises a plurality of L0 network nodes forming a L0 network and the L0 layer connectivity information includes information for connectivity of the plurality of L0 network nodes within the L0 network that is available to a Layer 3 (L3) network domain for establishing a L3 network; and
    sending the one or more BGP-LS advertisement messages to a network management system of the L3 network domain to allow the network management system of the L3 network domain to generate a connection request to the L0 network domain for connecting nodes in the L3 network based on the L0 layer connectivity information.

2. The method of claim 1, wherein the L0 network is an optical network and the L3 network is an IP network.

3. The method of claim 1, further comprising:
    receiving the one or more BGP-LS advertisement messages at a node in the L3 network;
    analyzing the L0 layer connectivity information in the one or more BGP-LS advertisement messages in order to determine connections available to the L3 network in the L0 network;
    sending the connection request from the node in the L3 network to the L0 network; and
    establishing connections between the nodes in the L3 network using available connections in the L0 network.

4. The method of claim 1, wherein the one or more BGP-LS advertisement messages are Network Layer Reachability Information (NLRI) messages and include a circuit message, the circuit message comprises a circuit identifier that identifies a circuit path in the L0 network, and head-end node descriptors and tail-end node descriptors that indicate a head-end node and a tail-end node for the circuit path.

5. The method of claim 1, wherein the L0 layer connectivity information comprises L0 network node topology, circuits between L0 network endpoint nodes, and points of attachment between the L0 network and the L3 network.

6. The method of claim 5, wherein the one or more BGP-LS advertisement messages include a type-length-value message that comprises attributes associated with the L0 network including latency and optical light wavelengths for optical links.

7. The method of claim 5, wherein the L0 layer connectivity information further comprises point of attachment information pertaining to node identifiers of network nodes in the L0 and L3 networks, autonomous systems associated with the node identifiers and points of attachment for the node identifiers.

8. The method of claim 7, wherein the one or more BGP-LS advertisement messages include a type-length-value message that comprises a node identifier for an advertising node, an autonomous system associated with the advertising node, and source and destination points of attachment.

9. An apparatus comprising:
    a network interface unit configured to communicate between a Layer 0 (L0) network and a Layer 3 (L3) network;
    a processor coupled to the network interface unit and configured to:
        generate, in a network management system of a L0 network domain, one or more Border Gateway Protocol-Link State (BGP-LS) advertisement messages comprising L0 layer connectivity information associated with the L0 network domain, wherein the L0 network domain comprises a plurality of L0 network nodes forming the L0 network and the L0 layer connectivity information includes information for connectivity of the plurality of L0 network nodes within the L0 network that is available to a L3 network domain for establishing the L3 network; and
        send the one or more BGP-LS advertisement messages to a network management system of the L3 network domain to allow the network management system of the L3 network domain to generate a connection request to the L0 network domain for connecting nodes in the L3 network based on the L0 layer connectivity information.

10. The apparatus of claim 9, wherein the processor is further configured to:
    receive the one or more BGP-LS advertisement messages at a node in the L3 network;
    analyze the L0 layer connectivity information in the one or more BGP-LS advertisement messages in order to determine connections available to the L3 network in the L0 network;

send the connection request from the node in the L3 network to the L0 network; and establish connections between the nodes in the L3 network using available connections in the L0 network.

11. The apparatus of claim 9, wherein the one or more BGP-LS advertisement messages are Network Layer Reachability Information (NLRI) messages and include a circuit message, the circuit message comprises a circuit identifier that identifies a circuit path in the L0 network, and head-end node descriptors and tail-end node descriptors that indicate a head-end node and a tail-end node for the circuit path.

12. The apparatus of claim 9, wherein the L0 layer connectivity information comprises L0 network node topology, circuits between L0 network endpoint nodes, and points of attachment between the L0 network and the L3 network.

13. The apparatus of claim 12, wherein the one or more BGP-LS advertisement messages comprises attributes associated with the L0 network including latency, optical light wavelengths, autonomous system number for optical links, and information pertaining to circuit paths in the L0 network.

14. The apparatus of claim 9, wherein the one or more BGP-LS advertisement messages include a type-length-value message that comprises a node identifier for an advertising node, an autonomous system associated with the advertising node, and source and destination points of attachment.

15. A non-transitory processor readable storage media encoded with instructions that, when executed by a processor, cause the processor to:

generate, in a network management system of a Layer 0 (L0) network domain, one or more Border Gateway Protocol-Link State (BGP-LS) advertisement messages comprising L0 layer connectivity information associated with the L0 network domain, wherein the L0 network domain comprises a plurality of L0 network nodes forming a L0 network and the L0 layer connectivity information includes information for connectivity of the plurality of L0 network nodes within the L0 network that is available to a Layer 3 (L3) network domain for establishing a L3 network; and send the one or more BGP-LS advertisement messages to network management system of the L3 network domain to allow the network management system of the L3 network domain to generate a connection request to the L0 network domain for connecting nodes in the L3 network based on the L0 layer connectivity information.

16. The non-transitory processor readable storage media of claim 15, further comprising instructions that, when executed by the processor, cause the processor to:

receive the one or more BGP-LS advertisement messages at a node in the L3 network;

analyze the L0 layer connectivity information in the one or more BGP-LS advertisement messages in order to determine connections available to the L3 network in the L0 network;

send the connection request from the node in the L3 network to the L0 network; and establish connections between the nodes in the L3 network using available connections in the L0 network.

17. The non-transitory processor readable storage media of claim 15, wherein the one or more BGP-LS advertisement messages are Network Layer Reachability Information (NLRI) messages and include a circuit message, the circuit message comprises a circuit identifier that identifies a circuit path in the L0 network, and head-end node descriptors and tail-end node descriptors that indicate a head-end node and a tail-end node for the circuit path.

18. The non-transitory processor readable storage media of claim 15, wherein the L0 layer connectivity information comprises L0 network node topology, circuits between L0 network endpoint nodes, and points of attachment between the L0 network and the L3 network.

19. The non-transitory processor readable storage media of claim 18, wherein the one or more BGP-LS advertisement messages comprises attributes associated with the L0 network including latency, optical light wavelengths, autonomous system number for optical links, and information pertaining to circuit paths in the L0 network.

20. The non-transitory processor readable storage media of claim 15, wherein the one or more BGP-LS advertisement messages include a type-length-value message that comprises a node identifier for an advertising node, an autonomous system associated with the advertising node, and source and destination points of attachment.

* * * * *